(12) United States Patent
Thoreson et al.

(10) Patent No.: US 11,220,614 B2
(45) Date of Patent: *Jan. 11, 2022

(54) METAL-BASED MEMBRANES FOR VAPOR INTRUSION MITIGATION

(71) Applicant: REGENESIS BIOREMEDIATION PRODUCTS, San Clemente, CA (US)

(72) Inventors: Kristen A. Thoreson, San Clemente, CA (US); Hieu Nguyen, San Clemente, CA (US); Scott B. Wilson, San Clemente, CA (US)

(73) Assignee: REGENESIS BIOREMEDIATION PRODUCTS, San Clemente, CA (US)

( * ) Notice: Subject to any disclaimer, the term of this patent is extended or adjusted under 35 U.S.C. 154(b) by 208 days.

This patent is subject to a terminal disclaimer.

(21) Appl. No.: 15/976,624

(22) Filed: May 10, 2018

(65) Prior Publication Data

US 2018/0327623 A1    Nov. 15, 2018

Related U.S. Application Data

(60) Provisional application No. 62/504,058, filed on May 10, 2017.

(51) Int. Cl.
  *C09D 121/02*  (2006.01)
  *B32B 27/06*   (2006.01)
  (Continued)

(52) U.S. Cl.
  CPC .............. *C09D 121/02* (2013.01); *B05D 7/14* (2013.01); *B05D 7/24* (2013.01); *B32B 27/06* (2013.01);
  (Continued)

(58) Field of Classification Search
  None
  See application file for complete search history.

(56) References Cited

U.S. PATENT DOCUMENTS

| 2,509,777 A | 5/1950 | Mcmillan et al. |
| 3,286,475 A | 11/1966 | Adams |

(Continued)

FOREIGN PATENT DOCUMENTS

| EP | 3402 A | * | 8/1979 |
| EP | 0 045 893 A | * | 2/1982 |

(Continued)

OTHER PUBLICATIONS

Mackenzie et al., "Carbo-Iron an Fe/AC composite as alternative to nano-iron for groundwater treatment", Water Res.; Aug. 2012, vol. 46 (12); pp. 3817-3826; (retrieved from Internet: (http:www///.sciencedirect.com/science/article/pii/S0043135412002552#), p. 38'9, col. 2. para 2; p. 3820, col. 1, para 4; p. 3822, col. 2, para 2-3; abstract.

(Continued)

*Primary Examiner* — Vivian Chen
(74) *Attorney, Agent, or Firm* — Stetina Brunda Garred & Brucker

(57) ABSTRACT

Barriers for improved vapor mitigation are contemplated, such barriers being formed as a cured latex-asphalt mixture applied to the metal surface of a metallized substrate. The latex-asphalt mixture, prior to curing, comprises an emulsion of an asphalt component, a latex component, and water. Such barriers may be seen to substantially mitigate diffusion of chemical contaminants across the barriers in the form of gas or liquids. Also contemplated are methods for forming such barriers, whether fabricated off-site for installation on site, fabricated in-situ.

13 Claims, 1 Drawing Sheet

(51) Int. Cl.

| | | |
|---|---|---|
| *B32B 27/36* | (2006.01) | |
| *B05D 7/14* | (2006.01) | |
| *C09D 195/00* | (2006.01) | |
| *B05D 7/24* | (2006.01) | |
| *B05D 1/02* | (2006.01) | |
| *B32B 15/04* | (2006.01) | |
| *B32B 5/06* | (2006.01) | |
| *B32B 5/02* | (2006.01) | |
| *C09D 107/02* | (2006.01) | |
| *C09D 109/10* | (2006.01) | |
| C09D 109/04 | (2006.01) | |
| C09D 109/08 | (2006.01) | |
| C09D 111/02 | (2006.01) | |

(52) U.S. Cl.
CPC .......... *B32B 27/36* (2013.01); *C09D 195/005* (2013.01); *B05D 1/02* (2013.01); *B05D 2401/20* (2013.01); *B05D 2520/05* (2013.01); *B32B 5/02* (2013.01); *B32B 5/06* (2013.01); *B32B 15/04* (2013.01); *B32B 2255/10* (2013.01); *B32B 2255/205* (2013.01); *B32B 2255/26* (2013.01); *B32B 2255/28* (2013.01); *B32B 2307/7242* (2013.01); *C09D 107/02* (2013.01); *C09D 109/04* (2013.01); *C09D 109/08* (2013.01); *C09D 109/10* (2013.01); *C09D 111/02* (2013.01); *C09D 195/00* (2013.01); *Y10T 428/31678* (2015.04); *Y10T 428/31681* (2015.04); *Y10T 428/31692* (2015.04); *Y10T 428/31717* (2015.04); *Y10T 428/31786* (2015.04); *Y10T 428/31815* (2015.04)

(56) References Cited

U.S. PATENT DOCUMENTS

| | | | |
|---|---|---|---|
| 3,785,852 A | | 1/1974 | Schleidt |
| 4,033,894 A | | 7/1977 | McLaughlin et al. |
| 4,096,304 A | * | 6/1978 | Greengrass ............. B32B 15/12 428/138 |
| 4,168,924 A | | 9/1979 | Draper et al. |
| 4,170,675 A | * | 10/1979 | Greengrass ............. A62C 2/06 428/109 |
| 4,211,822 A | | 7/1980 | Kurfman et al. |
| 4,396,665 A | * | 8/1983 | Rowe ..................... B32B 15/08 428/148 |
| 4,504,528 A | | 3/1985 | Zucker et al. |
| 4,664,809 A | | 5/1987 | Fenton et al. |
| 5,006,250 A | | 4/1991 | Roberts et al. |
| 5,137,764 A | * | 8/1992 | Doyle ..................... B32B 15/08 428/44 |
| 5,217,616 A | | 6/1993 | Sanyal et al. |
| 5,266,213 A | | 11/1993 | Gillham |
| 5,395,419 A | | 3/1995 | Farone et al. |
| 5,514,279 A | | 5/1996 | Blowes et al. |
| 5,580,770 A | | 12/1996 | DeFilippi |
| 5,591,118 A | | 1/1997 | Bierck |
| 6,158,477 A | * | 12/2000 | Waters .................. F16L 11/088 138/125 |
| 6,592,294 B1 | | 7/2003 | Moore |
| 6,596,190 B1 | | 7/2003 | Igawa et al. |
| 6,806,078 B2 | | 10/2004 | Newman |
| 7,101,115 B2 | | 9/2006 | Luthy et al. |
| 7,160,471 B2 | | 1/2007 | Looney et al. |
| 7,395,863 B2 | | 7/2008 | Wang et al. |
| 7,585,132 B2 | | 9/2009 | Imbrie |
| 7,845,883 B1 | | 12/2010 | Siler, III et al. |
| 7,963,720 B2 | | 6/2011 | Hoag et al. |
| 7,985,460 B2 | | 7/2011 | Polk |
| 8,748,331 B2 | | 6/2014 | Talley et al. |
| 8,986,545 B2 | | 3/2015 | Kolhatkar |
| 9,682,534 B1 | * | 6/2017 | Young ....................... B32B 7/12 |
| 2003/0047507 A1 | | 3/2003 | Hou et al. |
| 2003/0124292 A1 | * | 7/2003 | Unterreiter ............. E04D 5/148 428/40.1 |
| 2004/0031223 A1 | | 2/2004 | Durning et al. |
| 2004/0195182 A1 | | 10/2004 | Elliott |
| 2004/0249025 A1 | | 12/2004 | Dean |
| 2005/0124241 A1 | * | 6/2005 | Malik ..................... B32B 5/022 442/48 |
| 2005/0263460 A1 | | 12/2005 | Farone et al. |
| 2005/0282390 A1 | | 12/2005 | Bian et al. |
| 2006/0054570 A1 | | 3/2006 | Block et al. |
| 2006/0088498 A1 | | 4/2006 | Martin et al. |
| 2006/0196850 A1 | | 9/2006 | Roh et al. |
| 2007/0297858 A1 | | 12/2007 | Imbrie |
| 2008/0008535 A1 | | 1/2008 | Ball |
| 2008/0080934 A1 | * | 4/2008 | Duffney .................. B08B 15/02 405/128.2 |
| 2008/0125334 A1 | | 5/2008 | Burns et al. |
| 2008/0176943 A1 | | 7/2008 | Kaiser et al. |
| 2009/0197042 A1 | * | 8/2009 | Polk ........................ B32B 27/32 428/137 |
| 2010/0186846 A1 | * | 7/2010 | Carlay, II ............... F16L 11/045 138/137 |
| 2013/0045353 A1 | * | 2/2013 | Menage .................. B32B 27/32 428/76 |
| 2013/0058724 A1 | | 3/2013 | John et al. |
| 2015/0034559 A1 | | 2/2015 | Mork et al. |
| 2017/0038091 A1 | * | 2/2017 | Campbell ........... F24F 13/0263 |
| 2018/0327600 A1 | * | 11/2018 | Thoreson ............... C08L 95/005 |

FOREIGN PATENT DOCUMENTS

| | | | |
|---|---|---|---|
| EP | 0 410 275 A | * | 1/1991 |
| GB | 2261846 A | * | 6/1993 |
| GB | 2361485 A | * | 10/2001 |
| WO | WO 79/00539 A | * | 8/1979 |
| WO | 9849106 | | 11/1998 |
| WO | WO2015123569 | | 8/2015 |

OTHER PUBLICATIONS

Committee On Future Options for Management in the Nation's Subsurface Remediation Effort et al.; Prepublication Copy of Alternatives for Managing the Nation's Complex Contaminated Groundwater Sites; 2012; 339 pages; National Academy of Sciences; The National Academies Press; Washington, D C.; US.
Young, Lee W.; International Search Report; PCT/US 15/15899; dated Jan. 15, 2015; 8 pages.
Young, Lee W.; International Search Report; PCT/US 14/494,468; dated Aug. 2, 2013; 9 pages.
Copenheaver, Blaine R.; International Search Report; PCT/US2011/058388; dated Feb. 17, 2012; 6 pages.
Young, Lee W.; International Search Report; PCT/US 18/32145 ; dated Aug. 1, 2018; 10 pages.
Young, Lee W.; International Search Report; PCT/US 18/32392 ; dated Aug. 7, 2018; 10 pages.
Thomas, Shane; International Search Report; PCT/US17/22795; dated Jun. 9, 2017; 15 pages.
Copenheaver, Blaine R.; International Search Report; PCT/US2017/037242; dated Aug. 7, 2017; 13 pages.
John Scheirs, A Guide to Polymeric Geomembranes A Practical Approach pp. 182-187, 2009, John Wiley and Sons Ltd.†
Wilson, S.; Abbot, S.; Mallett, H., Guidance on the use of plastic membranes as VOC vapour barriers, pp. 11-12, 2014, CIRIA C748, www.ciria.org.†

\* cited by examiner
† cited by third party

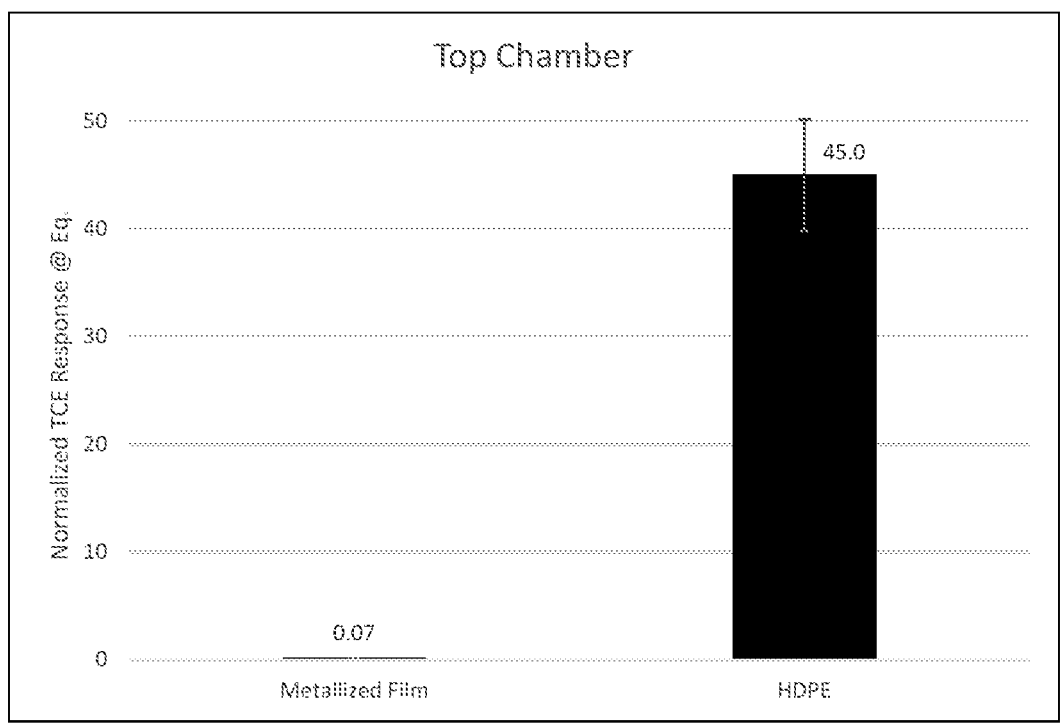

METAL-BASED MEMBRANES FOR VAPOR INTRUSION MITIGATION

CROSS-REFERENCE TO RELATED APPLICATIONS

This application relates to and claims the benefit of U.S. Provisional Application No. 62/504,058 filed May 10, 2017 and entitled "METAL-BASED MEMBRANES FOR VAPOR INTRUSION MITIGATION," the entire disclosure of which is hereby wholly incorporated by reference.

STATEMENT RE: FEDERALLY SPONSORED RESEARCH/DEVELOPMENT

Not Applicable

BACKGROUND

1. Technical Field

The present disclosure relates generally to the field of protective contaminant barriers. More particularly, the present disclosure relates to compositions and methods of creating vapor barriers to prevent the intrusion of toxic and/or carcinogenic vapors that can permeate from contaminated areas in the ground.

2. Related Art

Brownfield is a term used in the United States to describe property or land, typically in urban areas, that sits atop or near potentially hazardous substances. As such, when Brownfield sites are considered for new construction or redevelopment, there is often a need to address the contamination that can pose an ongoing health risk to humans. This is especially true when volatile contaminants (for example petroleum compounds like benzene or chlorinated solvents including tetrachloroethylene) are present in the soil and groundwater beneath the Brownfield sites. In these cases, the volatile toxins can permeate from the ground and through the concrete slab of a building, resulting in vapor intrusion within the building, either as vapors emanating upward through site soils, or within water as dissolved constituents. In some cases, it is possible to directly remediate the toxins present in the soil and groundwater using in situ methods. However this approach is not always available or feasible. As such, other methods such as various vapor mitigation techniques are relied upon to reduce health risks at the new developments.

Current vapor mitigation techniques include both active and passive ventilation systems, with passive systems being the more economical choice. One of the more common passive vapor mitigation strategies is the use of vapor barriers to prevent or reduce the ability of vapors to enter a building. These barriers are typically constructed of polyolefins such as low density polyethylenes (LDPE) or high density polyethylenes (HDPE) and are installed beneath the concrete slab of a new building. While these have been effective for vapor mitigation, they do have a weakness in that contaminants will partition into the polyolefin materials. Over time this will result in a weakened and ineffective barrier. In this regard, there is room for improvement in the performance of these barriers. Specifically, it is desirable to provide a barrier that does not absorb the contaminants over time and has improved resistance of contaminants.

The use of metallized films, for example biaxially oriented polyethylene terephthalate (BOPET) aluminized films, is known to be useful for slowing gas diffusion. Examples of this include use of such materials in the food packaging industry for preservation, as well as for reducing leakage in helium-filled balloons. Such materials have also been used for the successful mitigation of certain naturally occurring vapor contaminants like radon and methane. However metallized films have not been used widely for contaminant vapor mitigation because of their fragility, which often leads to rips and tears, and ultimately an ineffective barrier. The feasibility of using these barriers is exceptionally limited at typical brownfield construction sites where the base layer consists of angular gravel (as opposed to sand) to provide an airflow path, which is necessary should an active remediation system need to be emplaced at a future time. Such angular gravel would certainly result in holes.

It is possible to provide thicker metallized films to increase their ruggedness, for example, by including a thicker polymer base. However, the thickness required for substantial durability would result in a substantial reduction in flexibility, and a corresponding reduction in utility, especially in situations where flexibility is desirable, such as when sealing the barriers around penetrations and between seams.

Therefore, novel protective contaminant barriers that better mitigate against a broader range of chemical contaminants while retaining flexibility are desirable.

BRIEF SUMMARY

To solve these and other problems, barriers for mitigating diffusion of vapor and methods of forming such barriers are contemplated. According to an exemplary embodiment, such a barrier may comprise a metallized substrate, and the cured product of a latex-asphalt composition applied to the metallized substrate, wherein prior to curing, the latex-asphalt composition comprises an asphalt component, a latex component, and water.

The metallized substrate may comprise a metal layer bonded to a non-metal layer, with the metal layer comprising a continuous metal film having a thickness from 0.0001 to 0.02 inches. The metal layer may comprise one or more of: aluminum, silver, copper, tin, titanium, iron, gold, and combinations or alloys thereof.

The metallized substrate may have a non-metal layer that comprises a polymer. In certain specific embodiments, the polymer may be selected from one or more of: polyethylene terephthalate (PET), biaxially oriented polyethylene terephthalate (BOPET), polypropylene, biaxially oriented polypropylene (BOPP), polypropylene, polyester. In the metallized substrate, the metal layer may be bonded to the non-metal layer via one or more of: vapor deposition, vacuum deposition, adhesive bonding, and plasma treatment.

The asphalt component of the latex-asphalt composition may comprise one or more of: asphaltic bitumens, asphaltenes, maltenes, blown asphalt, straight residual oils, distillation residues, still bottoms, cracking residues, or combinations thereof. The ratio of asphalt component to latex component may be between 1:0.05 to 1:0.4 by weight.

The contemplated barriers may also further comprise a reinforcing material associated with the metallized substrate. In certain embodiments, the reinforcing material may comprise one or more of a geo-textile fabric, a woven material, an additional metal material, a polyolefin, a polyester, and combinations thereof. The reinforcing material may also be at least partially embedded within the metal layer of the metallized substrate. According to certain embodiments, the reinforcing material may have a grid configuration.

It is additionally contemplated that such barriers may also further comprise one or more protective layers disposed adjacent to the metallized substrate or the cured product of the latex-asphalt composition. Such protective layers may be, for example but without limitation, a geo-textile fabric, or a polyolefin, a metal, or combinations thereof. For example, protective layers may be non-woven polypropylene, non-woven polyester, needle punched polypropylene, needle punched polyester, spun/thermally bonded polyester, spun/thermally bonded polypropylene, high density polyethylene, low density polyethylene, an additional metallized substrate having a metal substrate, and combinations thereof. In certain embodiments, such protective layers may be between 0.005 to 0.016 inches in thickness.

According to certain embodiments, the protective barrier or even the non-metal component of the metallized substrate may be a geo-textile, which is a permeable fabric that is commonly used in connection with soil for civil engineering application, and may include, for example but without limitation, woven, needle-punch, or bonded fabrics formed from materials such as polypropylene, polyester, or other polymers.

The latex-asphalt composition may be applied in a continuous layer adjacent the metal surface or non-metal surface of the metallized substrate, and may form a continuous layer of between 0.02 inches to between 0.1 inches in thickness.

Methods of forming such barriers are also contemplated, such methods comprising the steps of applying a latex-asphalt composition to a metallized substrate, the latex-asphalt composition comprising an asphalt component, a latex component, and water, and allowing the latex-asphalt composition to cure. According to certain exemplary embodiments of such methods, the latex-asphalt composition may be applied to the metallized substrate via spraying. The latex-asphalt composition may also be applied in a continuous layer across the metallized substrate, or may be applied at selected portions of the metallized substrate.

Such methods of forming such barriers may also further comprise one or more additional steps of disposing one or more protective layers adjacent to the metallized substrate or the cured product of the latex-asphalt composition, with the one or more protective layers being selected from one or more of: a geo-textile fabric, or a polyolefin, a metal, or combinations thereof.

Methods for forming such barriers are further contemplated as comprising the steps of bonding a metal layer to a non-metal layer to form a metallized substrate, applying a latex-asphalt composition to the metallized substrate, the latex-asphalt composition comprising an asphalt component, a latex component, and water, and allowing the latex-asphalt composition to cure. According to such methods, the non-metal layer may comprise a preexisting surface proximal to a source of contamination.

BRIEF DESCRIPTION OF THE DRAWINGS

FIG. 1 is a graph showing a comparison of the extent of trichloroethelene (TCE) vapor intrusion across a barrier formed of the composition of the exemplary embodiment, compared to the TCE vapor intrusion across a barrier of an equivalent thickness of high-density polyethylene (HDPE).

DETAILED DESCRIPTION

According to various aspects of the present disclosure, new types of improved vapor barriers are contemplated, such improved vapor barriers being, in an exemplary embodiment, a metallized substrate formed of a metal layer bonded to non-metal layer, and the cured product of a latex-asphalt aqueous emulsion applied to the metallized substrate. Once cured, the barrier formed may perform significantly better relative to conventional vapor barriers in terms of resisting intrusion and degradation from chemical contaminants. The latex-asphalt composition, in the exemplary embodiment, is applied via spraying (preferably with a catalyst for breaking the emulsion) in order to form a continuous layer atop the metal surface of the metallized substrate. Once cured, such an exemplary barrier may be seen to show substantially improved resistance to chemical vapor intrusion relative to conventional barriers. According to other aspects of the present disclosure, variations of such barriers, and well methods of forming such barriers are also contemplated.

The metallized substrate, in the exemplary embodiment, comprises a polymer sheet coated with a metal layer. In the exemplary embodiment, the metallized substrate is formed of a metal layer formed of aluminum and non-metal layer formed of polyethylene terephthalate (PET), with a total thickness of 0.012 inches. However, it may be seen that in other embodiments, the metallized substrate may be comprised solely of a metal layer, and does not necessarily need to include a non-metal layer or any non-metal portions. The metal layer may consist of metals other than aluminum, such as silver, copper, tin, zinc, titanium, iron, gold, or combinations or alloys thereof. Further, it may be seen that in other embodiments, other thickness of metal layers may be utilized. For example, embodiments with thicknesses of metal layers from between 0.0001 to 0.02 inches are contemplated, as well as embodiments in which the metal layer is more or less thick than this range.

In the exemplary embodiment, the non-metal layer of the metallized substrate comprise a polymer sheet, and specifically, a sheet of polyethylene terephthalate (PET). However, it may be seen that in other embodiments, the non-metal layer of the metallized substrate may comprise any non-metal material suitable for having a metal layer placed against it to form a metallized substrate. In preferred embodiments, this non-metal layer is a polymer sheet, and may comprise polymers such as, but not limited to, biaxially oriented polyethylene terephthalate (BOPET), biaxially oriented polypropylene (BOPP), polypropylene, polyethylene, polyesters, polyethylene terephthalate (PET). However, it may also be seen that other non-metal materials may be used, and that such non-metal materials may even include natural or man-made in-situ features, such as a preexisting surface proximal to a source of contamination, like the physical geographic terrain itself, such as dirt, grass, rocks, concrete, wood, etc. So long as the surface permits the bonding of a metal layer to it to form the metallized substrate, the identity of the non-metal layer is not necessarily limited to layers formed of polymers or even necessarily non-metal layers for which the metal layer is bonded to off-site. It is explicitly contemplated that the metal layer as presently contemplated may be applied to, for example, a preexisting surface such as a manmade concrete wall or a natural rock face, or even natural or artificial turf surfaces.

The metal layer may be bonded to the non-metal layer by different methods including, but not limited to, vapor deposition, plasma treatment, vacuum deposition, or by adhering a continuous metal sheet to the polymer sheet. In the exemplary embodiment, the metal layer is aluminum that is bonded to the non-metal layer, which is PET, via vapor deposition. However, it may be seen that in other embodiments, any known method of bonding or affixing a metal layer to a non-metal layer may be utilized, without departing from the scope or spirit of the present disclosure.

A reinforcing material may also be associated with the metallized substrate. In the exemplary embodiment, the reinforcing material is a grid formed of PET that is embedded within the metal layer of the metallized substrate. However, it may be seen that other reinforcing materials may be utilized, such as a geo-textile fabric, a woven material, an additional metal material, a polyolefin, a polyester, or combinations thereof. Further, it may be seen that the reinforcing materials may have other forms or configurations that being a grid that is at least partially embedded within the metal layer of the metallized substrate. For example, it may be seen that a reinforcing material may include a wrapped material at least partially around the metal layer, such as a polyolefin film. It may also be seen that other configures of embedded reinforcing material may be utilized other than a grid or lattice.

The latex-asphalt composition, when formulated, is contemplated in the preferred embodiments to comprise an emulsion formed from 30%-80% by weight of the asphalt component, from 3% to 25% by weight of the latex component, and from 10% to 67% by weight of water. The ratio of asphalt component to the latex component by weight may be from 1:0.05 to 1:0.4. For example, in the exemplary embodiment, the composition for mitigating diffusion is an emulsion composed of 50% asphalt component, 9% latex component, and 41% water. Other embodiments may have more or less of these components, however, and it may be seen that by using more asphalt component, latex component, or water, the material properties of the composition or of the final cured barrier may be affected in various ways to result in variations, all within the scope and spirit of the present disclosure.

Herein, the term "asphalt" refers to dark brown to black semisolid or solid cementitious hydrocarbon materials which are completely or substantially soluble in carbon disulfide and in which asphaltic bitumens are the sole or predominant constituent. Asphalt occurs in nature or may be obtained by refining petroleum by distillation, precipitation, cracking, oxidation or similar operations. Asphalt suitable for use in the present disclosure include, without limitation, asphaltenes, maltenes, blown asphalt, straight residual oils, distillation residues, still bottoms, cracking residues, asphaltic bitumens, or combinations thereof.

One characteristics of asphalt is its particle size distribution. Particle size distributions are commonly measured via particle size analysis, an analytical technique in which the distribution of sizes of a solid or liquid particulate material is measured. Techniques for particle size analysis may include sieve analysis, direct optical imaging, and laser diffraction. Data from sieve analysis, the oldest of these techniques, is typically presented in the form of an S-curve of cumulative mass retained on each sieve versus the sieve mesh size.

One commonly used metric when describing particle size distribution are D-values. D-values can be thought of as the cutoff point for the diameter that divides the sample mass into a specified percentage when the particles are arranged on an ascending mass basis. Thus, the D10, D50, and D90 value are the intercept points on the S-curve for 10%, 50%, and 90% of the cumulative mass respectively. D10 is the diameter size at which 10% of the sample's mass are comprised of particles with a diameter less than this size, D50 is the diameter size at which 50% of the sample's mass are comprised of particles with a diameter less than this size, and D90 is the diameter size at which 90% of the sample's mass are comprised of particles with a diameter less than this size. Because D-values are well-established, more advanced methods of measuring particle size distribution than sieve analysis may also report in D-values.

According the exemplary embodiment, the asphalt component of the latex-asphalt composition has a D90 value of less than 25 microns, which means that 90% of the mass of the asphalt component is comprised of particles having a diameter (i.e. the largest dimension) of less than 25 microns. However, it may be seen that in other embodiments, the D90 value of the asphalt component may be more or less than 25 microns, and that the selection of an asphalt component having a larger or smaller D90 value may result in a change in the material properties of the final composition and/or cured composition which may affect its material properties in various ways. For example, selection of an asphalt having a different D90 value than in the exemplary embodiment may result in a composition that cures more quickly or less quickly than the exemplary embodiment, or in a more or less physically resilient cured composition, or in a cured composition that is more or less permeable or resistant to contaminants. It may thus be seen that such variations are within the scope and spirit of the present disclosure, which is not to be limited to merely the exemplary embodiment.

A latex is a stable dispersion (an emulsion) of polymers in an aqueous medium that solidifies by coalescence or coagulation of the polymer particles as the water evaporates. Latexes are naturally found in the form of natural latex rubber, which is a mixture of the polymer cis-1,4-polyisoprolene having a molecular weight between 100,000 to 1,000,000 daltons. Latexes are also manufactured synthetically, generally from petroleum byproducts. The most prevalent synthetic latexes are styrene-butadiene rubbers (SBR) derived from the copolymerization of styrene and 1,3-butadiene. Other common synthetic latexes may include those prepared from isoprene, chloroprene, and/or isobutylene.

According to the present disclosure, it is contemplated that the latex component may comprise any mixture of latexes. It may be seen that selection of a latex component having a certain choice of latex may result in a composition that cures more quickly or less quickly than the exemplary embodiment, or in a more or less physically resilient cured composition, or in a cured composition that is more or less permeable or resistant to certain chemicals or toxins. It may thus be seen that such variations are within the scope and spirit of the present disclosure, which is not to be limited to merely the exemplary embodiment.

The latex-asphalt composition may be applied to the metal surface of the metallized substrate according to known methods of applying compositions to a substrate. The latex-asphalt composition may also be applied to a non-metal surface of the metallized substrate, or combinations thereof. In the exemplary embodiment, the composition is applied via a two-component spray system further employing a calcium chloride catalyst to break the emulsion formed in the two-component spray system. However, other method of application may be used, such as spraying via a single spray system, or direct application via a paint brush, a paint roller, or a trowel, or even via direct hand application.

It is contemplated that the composition may be applied to the metallized substrate to form a monolithic layer across the entirety of the metallized substrate with a thickness of between 0.02 inches to 0.1 inches. In the exemplary embodiment, the composition is applied to a constant thickness of 0.04 inches. However, it may be seen that the composition may be applied in multiple layers, or across only a portion of the metallized substrate, or at thicknesses that are more or less thick than the layer of the exemplary embodiment.

For example, it may be preferable to apply the latex-asphalt composition to selected locations at the metallized substrate where intrusion by contaminants is most likely to occur. Such locations may be, for example but without limitation, locations where different panels of the metallized substrate are joined, or at the edges of the metallized substrate, or where the metallized substrate contacts an external material. It may also be seen that the thickness of the application of the latex-asphalt composition may vary, and the composition may not be applied, cured, or trimmed post-cure into a layer of uniform thickness, but that the thickness may vary to be thicker at certain locations, and less thick at others. Such variations in location of application or thickness at certain locations, in different embodiments, may result in more or less strength, durability, and permeability to various potential intrusions, depending on the nature of those variations.

Once applied, the composition cures upon the substrate, with the cured composition atop the substrate serving as a superior barrier. In the exemplary embodiment, the composition may fully cure within 1 days of application. However, in other embodiment, it may be seen that that the composition may take more or less time to fully cure.

It is also contemplated that the metallized substrates to which the latex-asphalt composition may be applied may also include natural or artificial features or surfaces that have been metallized, such as subsoil or topsoil, above or below-ground rock or cement interfaces, or natural or artificial voids that have been metallized and into which such composition may be poured or pumped. As such, it may be seen that by metalizing a surface and subsequently applying such latex-asphalt compositions to that surface, where the surface is between a location sought to be protected and a source of contamination, and subsequently permitting the latex-asphalt compositions to cure, a barrier may be formed in situ.

It is additionally contemplated that one or more protective layers may be disposed adjacent to either the metallized substrate or the cured latex-asphalt composition. Such protective layers may be, according to various embodiments, a sheet material of geo-textile or a polymer such as a polyolefin such as LDPE or HDPE, or combinations thereof. It may be seen that such protective layers may contribute to the durability material strength of the overall barrier, and may also contribute to the contaminant resistance of the barrier, such as by increasing the tensile strength of the barrier of protecting the barrier from accidental punctures during installation. According to one particular embodiment, the protective layers comprise a top protective layer wrapped over the cured latex-asphalt composition and a bottom protective layer wrapped below the metallized substrate.

A laboratory experiment was conducted to test the performance of the metallized substrate as an experimental barrier. A 0.012 inch thick experimental aluminum/PET metallized substrate barrier was tested alongside a 0.011 inch thick HDPE sheet that was utilized as a control barrier.

Each barrier was placed in a two-chamber apparatus, with each chamber separated by the barriers. The bottom chamber of the two-chamber apparatus was partially filled with an aqueous trichloroethylene (TCE) solution, with the vapor concentration of the TCE in the bottom chamber held constant at 7000 parts per million by volume. The top chamber was placed under a constant flow rate of 2.5 mL/min, and the vapor concentration of TCE in the top chamber was monitored over time to measure the extent of TCE vapor intrusion across the barriers. The results of the experiment show that the experimental barrier demonstrated nearly three orders of magnitude more chemical resistance than the HDPE barrier. These results can be correlated to a superior vapor protection as well as a longer barrier lifetime The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the exemplary embodiments.

What is claimed is:

1. A method for forming a barrier in situ at a site of contamination for mitigating diffusion of volatile contaminates from a volatile contaminant source, the method comprising the steps of:
    providing a metallized substrate in the path of diffusion of the volatile contaminant source, the metallized substrate having a surface facing towards the volatile contaminant source and a surface facing away from the volatile contaminant source, the metallized substrate comprising a metal layer bonded to a nonmetal layer and a reinforcing material at least partially embedded within the metal layer of the metallized substrate;
    applying a latex-asphalt composition to the surface of the metallized substrate facing away from the volatile contaminant source, the latex-asphalt composition comprising an asphalt component, a latex component, and water; and
    allowing the latex-asphalt composition to cure.

2. The method of claim 1, wherein the latex-asphalt composition is applied to the metallized substrate via spraying.

3. The method of claim 1, wherein the latex-asphalt composition is applied in a continuous layer across the metallized substrate.

4. The method of claim 1, wherein the latex-asphalt composition is applied at selected portions of the metallized substrate.

5. The method of claim 1, further comprising the step of disposing one or more protective layers adjacent to the metalized substrate or the cured product of a latex-asphalt composition, the one or more protective layers being selected from one or more of: a geo-textile fabric, or a polyolefin, a metal, and combinations thereof.

6. The method of claim 1, wherein the reinforcing material at least partially embedded within the metal layer of the metallized substrate comprises one or more of: a geo-textile fabric, a polyolefin, a polyester, an additional metal material, or combinations thereof.

7. The method of claim 1, wherein the reinforcing material associated with the metal layer of the metallized substrate is in a grid or lattice configuration.

8. The method of claim 7, wherein the reinforcing material with at least partially embedded within the metal layer of the metallized substrate comprises a grid formed of polyethylene terephthalate.

9. A method for forming a barrier for subsequent placement at a site of contamination for mitigating diffusion of volatile contaminates from a volatile contaminant source, the method comprising the steps of:
    bonding a metal layer to a non-metal layer to form a metallized substrate, the metallized substrate having a surface for placement facing towards the volatile contaminant source and a surface for placement facing away from the volatile contaminant source, the metallized substrate comprising a reinforcing material at least partially embedded within the metal layer of the metallized substrate;

applying a latex-asphalt composition to the surface of the metallized substrate for placement facing away from the volatile contaminant source, the latex-asphalt composition comprising an asphalt component, a latex component, and water; and allowing the latex-asphalt composition to cure.

10. The method of claim 9, wherein the non-metal layer comprises a preexisting surface proximal to a source of contamination.

11. The method of claim 9, wherein the reinforcing material with at least partially embedded within the metal layer of the metallized substrate comprises a grid formed of polyethylene terephthalate.

12. The method of claim 9, wherein the reinforcing material at least partially embedded within the metal layer of the metallized substrate comprises one or more of: a geotextile fabric, a polyolefin, a polyester, an additional metal material, or combinations thereof.

13. The method of claim 9, wherein the reinforcing material at least partially embedded within the metal layer of the metallized substrate in a grid or lattice configuration.

* * * * *